J. F. STEVENS.
WEED PULLER.
APPLICATION FILED OCT. 8, 1920.

1,407,232. Patented Feb. 21, 1922.

Inventor
John F. Stevens
by Orwig & Hague Attys

UNITED STATES PATENT OFFICE.

JOHN F. STEVENS, OF OTTUMWA, IOWA.

WEED PULLER.

1,407,232. Specification of Letters Patent. Patented Feb. 21, 1922.

Application filed October 8, 1920. Serial No. 415,665.

*To all whom it may concern:*

Be it known that I, JOHN F. STEVENS, a citizen of the United States, and resident of Ottumwa, in the county of Wapello and State of Iowa, have invented a certain new and useful Weed Puller, of which the following is a specification.

The object of my invention is to provide a weed puller of simple, durable and inexpensive construction, capable of pulling and removing the roots of weeds or similar plants from a lawn without injuring the surrounding grass or materially disfiguring the surface, and at the same time capable of removing substantially the entire top root or crown portion.

A further object is to provide in a weed puller having coacting digger members capable of movement toward each other, and adapted to enter the ground to extract a weed root, improved means for automatically discharging the removed root and dirt from the said digger members.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
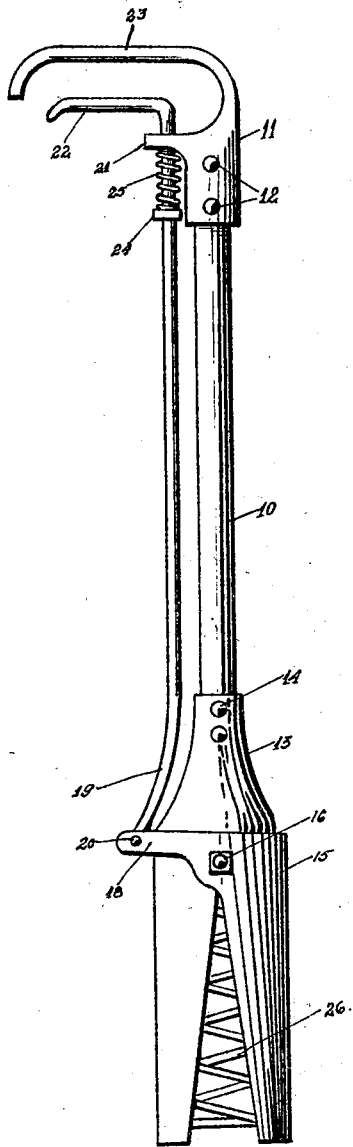
Figure 1 shows a side elevation of my improved weed puller.
Figure 2:
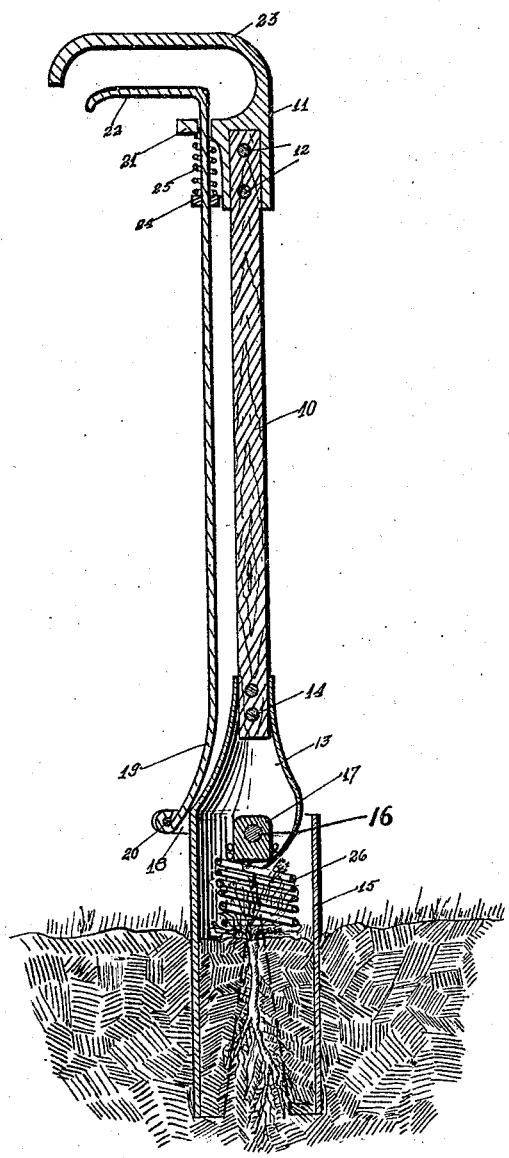
Figure 2 shows a vertical sectional view as applied when extracting a weed root.

The device comprises a handle portion 10 which may be formed of wood or other suitable material, provided at its upper end with a hand member 11 secured in position by means of rivets 12. The lower end of the member 10 is provided with a digger member 13, which is secured in position by means of rivets 14, the member 13 being formed conical at its upper end and substantially semi-cylindrical at its lower end. The edges of the lower portion are slightly tapered, so that the free or lower end of said member is slightly narrower than the upper end.

A second digger member 15 is formed, substantially semi-cylindrical, and so arranged as to be pivotally mounted at its upper end to the member 13 by means of a bolt 16. This bolt 16 extends diametrically through said members, and is designed to carry a block 17 on its central portion. The upper end of the member 15 is provided with two arm members 18, which extend to the back side of the member 13 and are designed to receive a rod 19 between them, which is secured in position by means of a rivet 20. The rod 19 is slightly curved to conform to the shape of the member 13, so that the said rod will lie close to the handle 10, and is slidably mounted in a bracket member 21 on the handle 11. The upper end of the rod 19 is provided with a lateral portion 22, designed to lie immediately under the hand portion 23 of the handle.

The rod 19 is provided with a collar 24, which is designed to rest against the lower end of an extension spring 25, the upper end of which rests against the bracket 21. This spring is for the purpose of holding the member 15 to its open position of movement.

The block 17 is provided with a coil spring 26, which is of a diameter slightly smaller than the inside of the members 13 and 15, and of a length when in its expanded position substantially equal to the length of said member 15, as shown in Figure 1.

In operation when it is desired to extract a weed from the lawn the members 13 and 15 are held in their outward limit of movement, as shown in Figure 1. The device is then grasped by the hand portion 23, and the digger members 13 and 15 placed concentrically over the center of the plant, after which a downward movement is imparted to the said members by applying sufficient weight to the member 23. The members 15 and 13 will then enter the ground and cut a large portion of the branches or laterally extending roots. This downward movement will cause the spring 26 to be compressed or moved to its upper limit of movement.

After the members 13 and 15 have been sufficiently forced into the ground, the member 22 is grasped by the fingers and pulled upwardly. This will cause the rod 19 to be elevated and the arm 18 to be actuated, which in turn will cause the lower end of the member 15 to be moved toward the lower end of the member 13. This will cause the core of dirt within said members, together with the crown portion of the root, to be gripped, after which the whole device may be elevated, carrying the root and core with it.

When it is desired to empty the digger members, the operator simply releases the member 22, allowing the spring 25 to force the rod 19 downwardly, thereby loosening the pressure on the core within the members 13 and 15, which will be forced outwardly from between them by means of the spring 26.

It will, therefore, be seen that I have provided a weed puller of comparatively simple, durable and inexpensive construction, which is designed to quickly and easily extract a root from a lawn surface without tearing up a large portion of the same, and also which may be easily and quickly emptied.

It will be seen that by forming the digger members cylindrical, they are adapted to cut a large portion of the lateral roots before the crown portion is removed. This causes the root to be more easily removed, and also at the same time prevents a large hole from being torn in the lawn.

I claim as my invention:

1. A weed puller comprising a handle, a segmental digger member fixed to the handle, a second segmental digger member pivotally connected with the first, whereby its lower end may move toward and from the lower end of the stationary digger member, said digger members having straight sides and being normally arranged substantially parallel, whereby they may be easily thrust into the ground, a spring supported at its upper end between the digger members with its lower end normally near the bottom of the digger members, said digger members being capable of freely moving toward and from each other regardless of the position of spring, and a handle connected with the movable digger member whereby its lower end may be forced toward the lower end of the stationary digger member.

2. A weed puller comprising a handle, a segmental digger member fixed to the handle, a second segmental digger member pivotally connected with the first, whereby its lower end may move toward and from the lower end of the stationary digger member, said digger members having straight sides and being normally arranged substantially parallel, whereby they may be easily thrust into the ground, a spring supported at its upper end between the digger members with its lower end normally near the bottom of the digger members, said digger members being capable of freely moving toward and from each other regardless of the position of spring, and a handle connected with the movable digger member whereby its lower end may be forced toward the lower end of the stationary digger member, grip members for the two handles whereby the movable one may be conveniently held by the operator in position with the digger members substantially parallel and also whereby the movable handle member may be conveniently moved by the operator to position for clamping material in between the lower ends of the digger members.

Des Moines, Iowa, September 7, 1920.

JOHN F. STEVENS.